United States Patent

[11] 3,604,013

| [72] | Inventor | Harold W. Hammond<br>67 Hyslap Road, Brookline, Mass. 02146 |
|---|---|---|
| [21] | Appl. No. | 860,202 |
| [22] | Filed | Sept. 23, 1969 |
| [45] | Patented | Sept. 14, 1971 |

[54] EYE PROTECTOR FOR USE WITH SPECTACLES
3 Claims, 5 Drawing Figs.
[52] U.S. Cl. ........................................ 2/13,
351/47
[51] Int. Cl. ........................................ G02c 9/04
[50] Field of Search ........................................ 351/47, 48,
49, 57, 58; 2/13

[56] References Cited
UNITED STATES PATENTS

| 1,805,396 | 5/1931 | Havens | 351/47 |
| 2,795,793 | 6/1957 | Sommers | 2/13 |
| 3,011,170 | 12/1961 | Lutz | 351/47 X |
| 3,023,418 | 3/1962 | Hammond | 351/47 X |

Primary Examiner—David Schonberg
Assistant Examiner—John W. Leonard
Attorney—Harold E. Cole ABSTRACT: An eye protector has a visual member having two shading visual portions spaced oppositely apart which also serve as attaching or supporting means for mounting on a spectacle frame. An overhead shade, which is supported by said visual member, extends forwardly and rearwardly from the latter, and protects the eyes from overhead light.

PATENTED SEP 14 1971 3,604,013
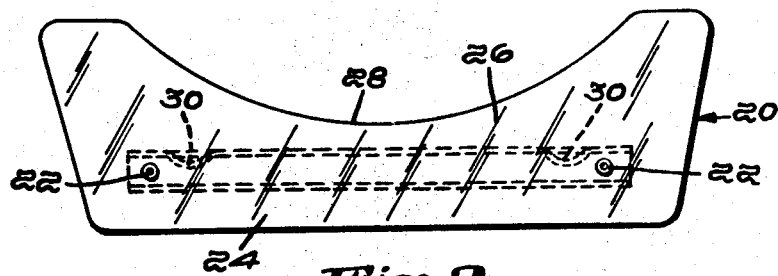
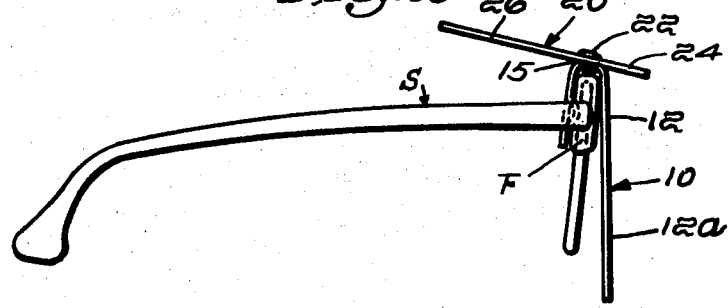
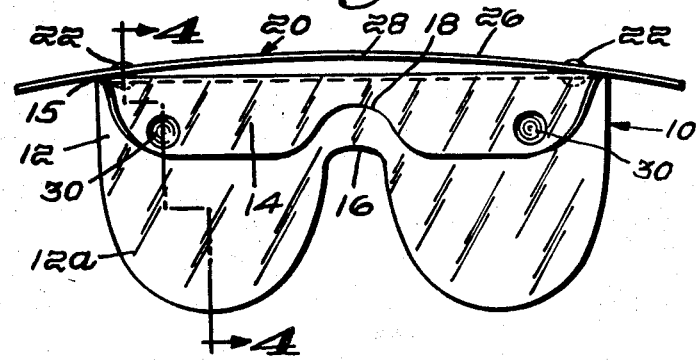
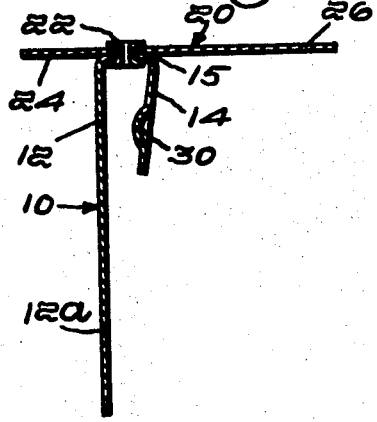
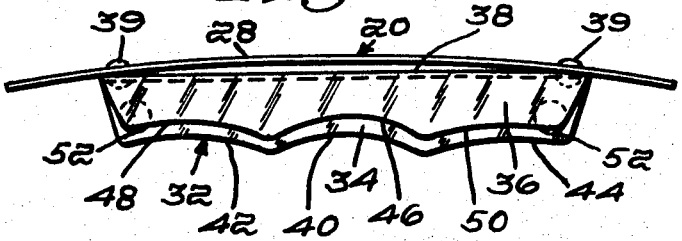
Inventor:
Harold W. Hammond
by Harold E. Cole
Attorney

EYE PROTECTOR FOR USE WITH SPECTACLES

The principal object of my invention is to provide my eye protector both with a visual member and an overhead shade which has a rearwardly extending portion that fits a person's forehead, and also a portion that projects forwardly beyond said visual member.

The foregoing and other objects which will appear as the nature of the invention is better understood, may be accomplished by a combination and arrangement such as is disclosed by the drawing. The nature of the invention is such as to render it susceptible to various changes and modifications, and therefore, I am not to be limited to the construction disclosed by the drawing, nor to the particular parts described in the specification, but am entitled to all such changes therefrom as fall within the scope of my invention.

In the drawing:

FIG. 1 is a top plan view of my eye protector.

FIG. 2 is a side elevational view thereof shown attached to the frame of a spectacle.

FIG. 3 is a rear elevational view of said protector.

FIG. 4 is a sectional view taken on the line 4—4 of FIG. 3, but showing the shade extending horizontally.

FIG. 5 is a rear elevational view of a modified form of my invention.

As illustrated, my eye protector has a visual member 10, preferably integral and made of plastic such as acetate that is translucent or optically clear. Prescription lens may be used. It has a front portion 12 and a rear portion 14 which are joined by a loop or connector portion 15 at the top thereof, as shown. Each said portion 12 and 14 has a cutout 16 and 18 respectively intermediate opposite sides to accommodate the nose of the wearer.

Said front visual portion 12 has a visual normal portion 12a that extends considerably lower than said rear portion 14 and provides visual shading protection from light at all times since it serves as a front cover for spectacle lens. This portion 12a may be curved or bent inwardly if it is desired to follow the usual curvature of a special lens.

The portions above said normal portions 12a each serve a visual purpose since they shield the eyes from the glare of headlights or other excessive light, yet permitting vision of the road or anything ahead.

Above said visual member 10 is an overhead shade 20 that may be made of vinyl. It is shown attached to said connector portion 15 as by eyelets 22 extending between them. This shade 20 has a front portion 24 projecting forwardly one-half inch or more of said visual member 10, and a projecting rear portion 26 extending rearwardly thereof. The latter has a relatively large intermediate cutout 28 to comfortably accommodate a person's forehead.

Said shade 20 preferably has an intermediate raised or arched portion 28 that makes the contact with the forehead of a wearer more confortable. It also provides air space between said shade 20 and said loop portion 15.

As shown one or more dimples or bulges 30 extending inwardly may be provided in said front visual portion 12, bringing the two visual portions 12 and 14 closer together at this point. This provides a better grip when my protector is mounted on a frame F of the usual spectacle S.

FIG. 5 shows a modified form of my invention in which a visual member 32 has a front portion 34 and a rear portion 36 which are connected by a connector portion 38 similar to connector portion 15. Eyelets 39 connect said connector portion 38 to said shade 20. Said front portion 34 has an intermediate cutout 40 and at opposite sides thereof is a left cutout 42 and a right cutout 44. Said rear portion 36 has an intermediate cutout 46, and at opposite sides thereof is a left cutout 48 and a right cutout 50. Bulges or dimples 52 enable tighter gripping by said visual member 32 of the lens frame F of spectacle S.

The parts of my eye protector may be formed integrally, using a suitable, visual plastic such as acetate, for instance.

What I claim is:

1. An eye protector in combination with spectacles having lens and a frame therefor, said protector comprising an optically clear visual member having front and rear portions oppositely disposed and spaced apart and receiving said spectacle frame between them, said visual member embodying a unitary connector portion extending between said front and rear portions in the form of a loop, said front portion extending forwardly of and supported by and directly above said visual member and extending forwardly of said visual member, an intermediate portion of said shade at opposite sides of said intermediate portion being attached to said connector portion.

2. An eye protector in combination with spectacles as of claim 1, said shade having a cutout therein extending from the rear edge forwardly at a point intermediate opposite sides thereof for a greater portion of the width thereof.

3. An eye protector in combination with spectacles as of claim 1, one of said visual member portions having a projecting portion opposite of and extending towards the second of said visual portions to thereby narrow the space between said visual member portions.